Patented Sept. 22, 1936

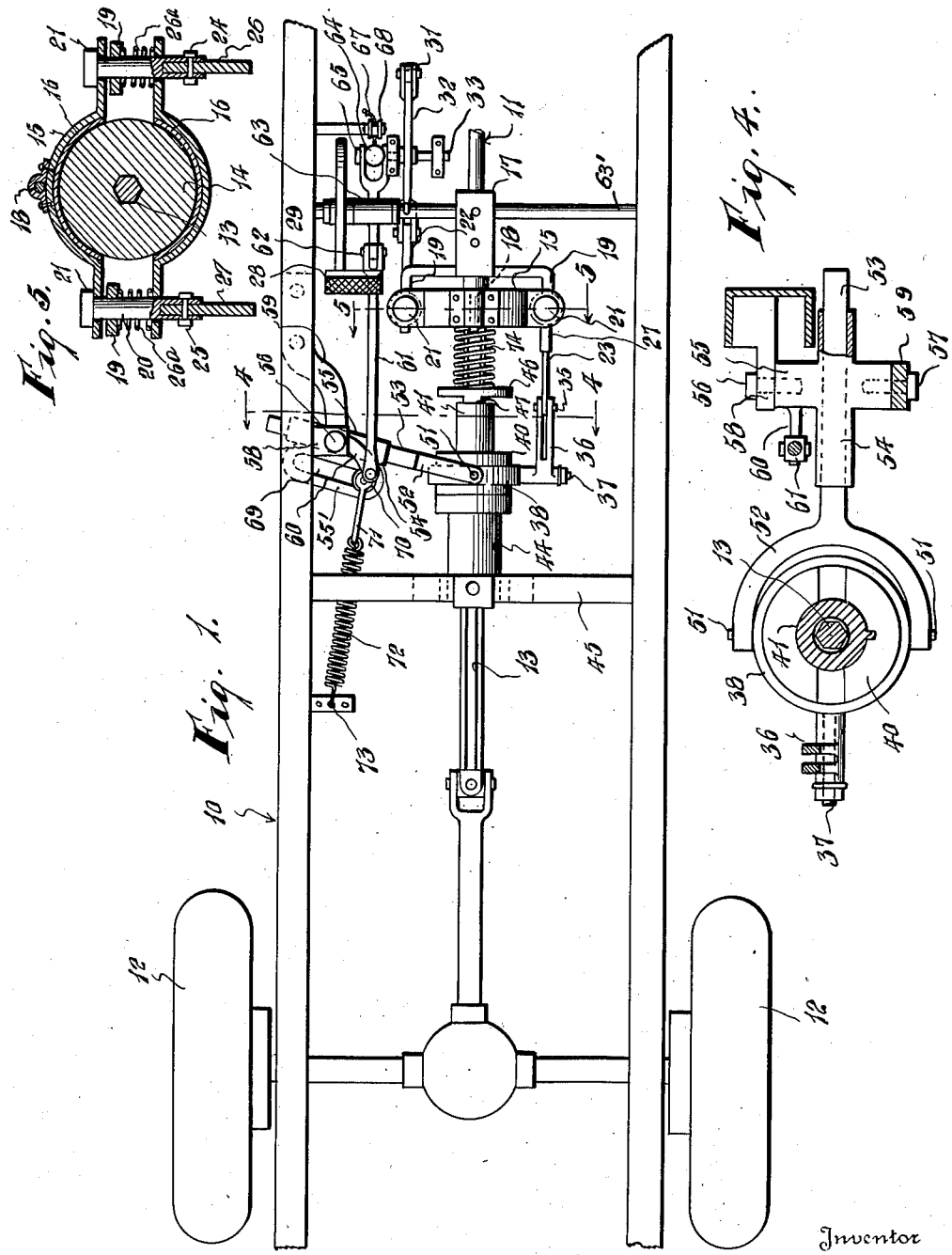

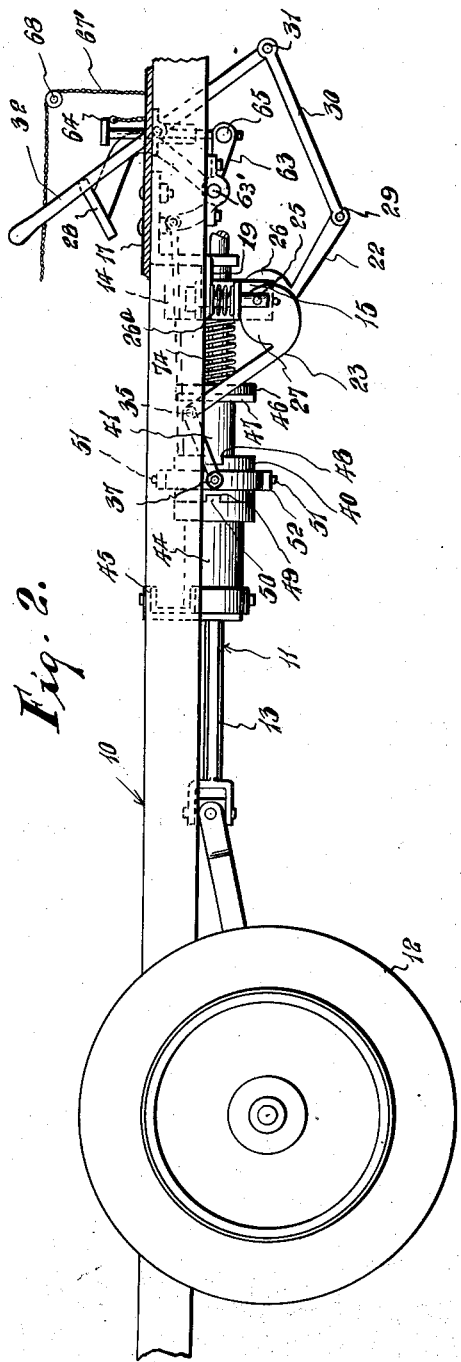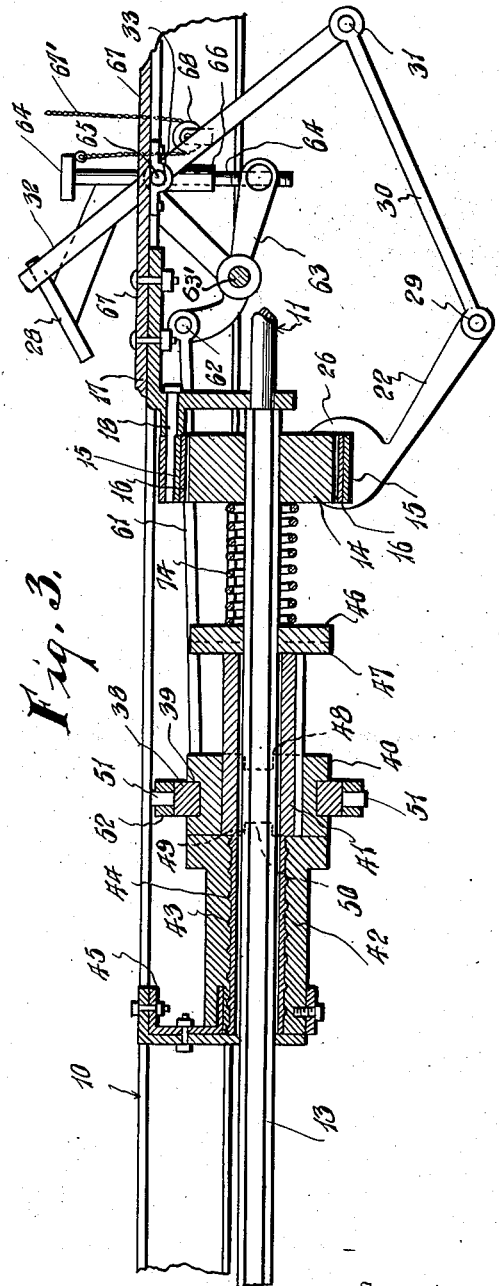

2,055,267

UNITED STATES PATENT OFFICE 2,055,267

SAFETY BRAKE

Walter B. Uffert, East Rockaway, N. Y., assignor of twenty-five one-hundredths to Francis Van Winkle, New York, N. Y.

Application May 29, 1935, Serial No. 24,110

7 Claims. (Cl. 188—140)

This invention relates to a brake mechanism adapted to afford maximum safety in connection with the device with which it is used, for instance, a vehicle, hoist, crane, derrick or the like.

It is particularly aimed to provide such a device which is adapted to be applied positively through motion of a rotating part, such as a propeller shaft of a self-propelled vehicle.

The more specific objects and advantages will in part be pointed out and otherwise become apparent from a consideration of the description following taken in connection with accompanying drawings illustrating an operative embodiment.

In said drawings:—

Figure 1 is a fragmentary plan view showing the improvement applied to a self-propelled vehicle;

Figure 2 is a side elevation of the parts of Figure 1;

Figure 3 is an enlarged central longitudinal sectional view through the parts constituting the invention;

Figure 4 is a cross section taken on the line 4—4 of Figure 1; and

Figure 5 is a cross section taken on the line 5—5 of Figure 1;

Referring specifically to the drawings, wherein like reference characters designate like or similar parts, the invention has been illustrated in connection with a conventional self-propelled vehicle generally designated 10. It is to be understood, however, that the invention may be used in various other relations where a safety brake is desired, and for instance in hoists, cranes, derricks and the like.

Reverting to the self-propelled vehicle 10, the propeller shaft thereof is designated 11 and is adapted to drive through a usual differential, the rear wheels 12. Said propeller shaft has a portion 13 which is hexagonal, octagonal or otherwise polygonal in cross section and thereon a brake drum 14 is suitably fastened in any desired manner. About said brake drum are a pair of shoes 15, having lining 16 normally spaced from the drum. Suitably fastened to the vehicle chassis is a bracket 17 carrying a supporting pin 18 loosely engaging the upper shoe 16. Said bracket 18 also has rearwardly extending arms 19, serving to mount bolts or headed rods 20 loosely. Said rods 20 also pass loosely through the shoes or bands 16 and the heads 21 of such bolts rest on the uppermost shoe 16.

Said bolts or rods 20 at their lower ends, below the adjacent portions of the shoe 15, are bifurcated, and a lever 22 is disposed in one bifurcation and a lever 23 is disposed in the other bifurcation, pivots 24 and 25, respectively pivoting the levers 22 and 23 to the bolts. Said levers at the bolts, have cam portions 26 and 27 respectively, which engage the under surface of the shoe or band 15. Expansive coil springs 26a surround the bolts 20 between the bracket arms 19 and the band or shoe 15.

Normally, the cam of the lever 22 maintains the adjacent end of shoe 15 at the upper limit of movement of the latter, it being understood, however, that at such limit, the lining of the bands or shoes does not contact the drum 14. The lever 23, however, is normally in such position, that is, with the vehicle running, with the other ends of the shoes 15 and 16 separated the maximum distance apart so as to be clamped about or engage the drum 14 through rotation of the lever 23 and cam 27, the latter acting on the shoe 15 and drawing the shoes together. The lever 23 is adapted to be operated through depression of the usual foot brake or pedal 28 of the vehicle, connected with conventional brake mechanism associated with the wheels of the vehicle 10.

Said lever 22 is pivotally connected at 29 to a link 30 which in turn is pivoted at 31 to a lever 32 journaled on a rod 33 which may be the same rod on which the brake pedal 28 is pivoted. Lever 32 is in its rearmost position when cam 26 is applied and in order to release the shoes 15 and 16 from the drum 14, said lever 32 is adapted to be moved forwardly at the upper or free end, thus causing the cam 26 to recede and the spring 26a adjacent to the cam 26 to separate the shoes or bands at that end.

Lever 23 is pivotally connected at 35 to a link 36 in turn pivoted on a laterally projecting pin 37 of a ring 38 seated in a groove 39 of a collar 40. Said collar 40 is splined to and slidable along an enlarged portion 41 of a sleeve 42 having screw threads at 43 engaged with screw threads on the interior of a bearing 44 fastened to a cross beam 45 of the chassis of the automobile 10. Collar 40 is movable between bearing 44, and a plate or disk 46 keyed to and rotatable with the propeller shaft 11. Said plate 46 has a diametric rib 47 adapted to be engaged by a diametric groove 48 of the collar 40, the collar also having a diametric groove 49 adapted to engage a rib 50 on the adjacent end of the bearing 44.

The ring 38 at top and bottom has trunnions or pins 51 to which a yoke 52 is pivoted. Yoke 52 has an arm 53 slidably telescoped in a sleeve 54 of a control lever 55, the latter being pivoted by means of pins 56 and 57, engaging brackets or supports 58 and 59, suitably fastened to the chassis of the vehicle. Said control lever 55 has a crank 60 to which a link 61 is pivoted and which in turn is pivoted at 62 to a lever 63, pivoted on a rod 63' on the vehicle chassis and at the other end of which lever, an upstanding plunger 64 is pivoted at 65, being guided through a suitable sleeve or opening 66 in the floor board 67 of the vehicle. Said pin or plunger 64 is in the path of applying or downward movement of the brake pedal 28 so as to be applied through the application of the foot brake. However, it may be applied independently, as in case of emergency, from within a bus or other vehicle through the pulling of a flexible chain or other element 67 trained over suitable guide means 68 and connected to the plunger 64.

Said control lever 55 has an extension 55' provided with an elongated slot 69 in which a roller 70 is adapted to travel and which roller is carried by a link 71, having a contractile coil spring 72 fastened thereto, and in turn fastened at 73 to the chassis of the automobile. Due to the movement of extension 55' with the lever 55, the angularity of slot 69 is reversed in the applied and unapplied condition of the brakes, the roller 70 and link 71 being moved toward that end of the slot 69 nearest to the spring 72 through contraction of that spring.

A strong expansive coil spring 74 surrounds the propeller shaft 11 abutting the plate 46 at one end and the brake drum 14 at the other end.

When the vehicle is in motion, cam 26 is applied and the cam 27 is in release position. To apply the brake bands 15 and 16, pedal 28 is depressed which in turn depresses the plunger 64. However, in case of emergency, the flexible element 67 may be pulled which would also depress the plunger 64. The depression of said plunger rocks lever 63, drawing link 61 forwardly and rocking the control lever 55 on its pivots 56—57, causing yoke 52 to move the ring 38 and accordingly the collar 40 into contact with plate 46, with the rib 47 and groove 48 engaging. As plate 46 rotates with the shaft, the coupling of the plate and collar 40, causes screw sleeve 42 to turn and by means of the screw threads 43, move forwardly, sliding the plate 46 and compressing the spring 74, at the same time moving the link 36 and applying the lever 23 and cam 27, thus applying the shoes 15 and 16. The power of rotation of propeller shaft 11 is thus made to effectively apply the brake shoes 15 and 16. When the collar 40 reaches position engaging the plate 46, the roller 70 travels to the other end of slot 69 with a snap action, the spring 72 urging it and holding it in the latter position. Of course when the plate 46 moves forwardly, the spring 74 is compressed. In starting up the vehicle after application of the shoes 15 and 16 in the manner stated, the lever 32 at the upper end is thrust forwardly which moves the cam 26 to its retracted position, thus releasing the shoes from engagement with the drum. During this action and thereafter, as the foot is released from the pedal 28, the spring 74 forces the plate 46 rearwardly and the screw sleeve 42 and collar 40 to the normal position shown in Figures 1 and 3, the spring 72 moving the link 71 and roller 70 to the other end of slot 69 due to the reversal of the angle of extension 55' and slot 69.

Various changes may be resorted to provided they fall within the spirit and scope of the invention.

What is claimed is:—

1. In combination with a rotatable shaft, a drum thereon, band means applicable to brake said drum, interengaged screw parts including a sleeve movable along the shaft, a plate slidable on the shaft, a coil spring positioning said plate, a collar slidable on the sleeve, means of interengagement between said collar and plate effective through said sliding movement, and means operable to apply said band means through said sliding movement.

2. In combination with a rotatable shaft, a drum thereon, band means applicable to brake said drum, interengaged screw parts including a sleeve movable along the shaft, a plate slidable on the shaft, a coil spring positioning said plate, a collar slidable on the sleeve, means of interengagement between said collar and plate effective through said sliding movement, means operable to apply said band means through said sliding movement, and lever and link means operable to slide said collar.

3. In combination with a depressible brake pedal, a rotatable shaft, a drum thereon, band means applicable to brake said drum, interengaged screw parts including a sleeve movable along the shaft, a plate slidable on the shaft, a coil spring positioning said plate, a collar slidable on the sleeve, means of interengagement between said collar and plate effective through said sliding movement, means operable to apply said band means through said sliding movement, and lever and link means operable to slide said collar having an operating plunger arranged in the path of depression of the brake pedal of the vehicle.

4. In combination with a rotatable shaft, a drum thereon, band means applicable to brake said drum, interengaged screw parts including a sleeve movable along the shaft, a plate slidable on the shaft, a coil spring positioning said plate, a collar slidable on the sleeve, means of interengagement between said collar and plate effective through said sliding movement, means operable to apply said band means through said sliding movement, a lever and yoke in telescopic connection, said yoke being connected to the collar, means operable to swing said lever to apply the brake, and spring means having a snap action past dead center to secure the lever and yoke in its extreme positions.

5. A device of the class described having a propeller shaft, a drum thereon, brake shoes coacting with the drum, releasable means maintaining said shoes at their minimum distance apart at one end, and releasable means to apply the other ends of said shoes, and mechanism operable through the said shaft to apply the shoes at the last mentioned ends.

6. A device of the class described having a propeller shaft, a drum thereon, brake shoes coacting with the drum, releasable means maintaining said shoes at their minimum distance apart at one end, releasable means to apply the other ends of said shoes, and mechanism operable through the said shaft to apply the shoes at the last mentioned ends, said means at the opposite ends of the shoes each including a lever having a cam engaging one of the shoes.

7. A device of the class described having a propeller shaft, a drum thereon, brake shoes coacting with the drum, releasable means maintaining said shoes at their minimum distance apart at one end, releasable means to apply the other ends of said shoes, and mechanism operable through the said shaft to apply the shoes at the last mentioned ends, including screw means, a plate engaged therewith rotatable with the shaft and slidable along the same, and an expansive spring compressed through the movement of said plate.

WALTER B. UFFERT.